US005936822A

United States Patent [19]

Bazarian

[11] Patent Number: 5,936,822

[45] Date of Patent: Aug. 10, 1999

[54] COAXIAL SURGE ARRESTER

[75] Inventor: Albert Bazarian, Lake Forest, Ill.

[73] Assignee: Reliable Electric, Warrenville, Ill.

[21] Appl. No.: 08/926,234

[22] Filed: Sep. 10, 1997

Related U.S. Application Data

[63] Continuation of application No. 08/636,162, Apr. 22, 1996, abandoned.

[51] Int. Cl.[6] .......... H02H 1/04

[52] U.S. Cl. .......... 361/117; 361/119

[58] Field of Search .......... 361/117, 118, 361/119, 56, 91, 111

[56] References Cited

U.S. PATENT DOCUMENTS 3,858,077 12/1974 Bazarian et al. .......... 361/120

*Primary Examiner*—Sally C. Medley

*Attorney, Agent, or Firm*—Trexler, Bushnell, Giangiorgi & Blackstone, Ltd.

[57] ABSTRACT

A novel gas tube assembly and a novel connector assembly using the novel gas tube assembly. The gas tube assembly includes an outer conductive electrode having a generally tubular construction, an inner conductive electrode also having a generally tubular construction, and a pair of insulating members. The outer and inner electrodes have first and second ends. The insulators are attached to the first and second ends of both the outer electrode and the inner electrode retaining the inner electrode inside and spaced away from the outer electrode. The first and second ends of the inner and outer electrodes are sealed by the respective insulator. A chamber is defined between an internal surface of the outer electrode, an external surface of the inner electrode, and corresponding surfaces of the insulators. The chamber defines a toroidal void within the gas tube assembly which retains an inert gas therein. The gas tube assembly may be employed with a connector assembly to provide standardized connection to coaxial conducting media.

38 Claims, 5 Drawing Sheets

COAXIAL SURGE ARRESTER

CROSS-REFERENCE

This application is a continuation application of U.S. patent application Ser. No. 08/636,162, filed Apr. 22, 1996, now abandoned.

BACKGROUND

The need for improved low-cost protection of coaxial transmission lines from lightening strikes and induced power surges has emerged in the communication technology coincident with the proliferation of coaxial systems in cellular telephone and coaxial usage for broadband transmission. Coaxial transmission is characterized as a continuous path capable of directing the transmission of electromagnetic energy along its path. If the geometrical dimensions and the constants of the materials are identical, the line is said to be uniform. Any changes in the physical configuration of the transmission line are said to be nonuniformities or discontinuities in the system.

Although many types of lightening protectors are manufactured and sold for use in coaxial systems for lightening protection, they all have a common deficiency in that they all create a discontinuity in the path of the coaxial line. The common feature of all existing protectors is that the protecting element is connected between the center conductor of the coax and the outside sheath. In effect, the protecting element is placed in shunt with the transmission line. This placement creates a nonuniformity which results in a higher insertion loss and also a higher reflection loss to the electromagnetic waves which are propagated on the line.

Existing protectors have attempted to compensate for the discontinuities by placement of shunt voltage limiters by modifying either the inner or outer diameter of the line to obtain the equivalent of the characteristic impedance of the line. This procedure has been successful only for limited regions of the bandwidth. The compensations provide acceptable transmission for limited bandwidths but not for the full spectrum bandwidth capability of the line. In today's market, the crowded electromagnetic spectrum has necessitated the efficient and complete usage of all available bandwidth.

A device as shown in U.S. Pat. No. 4,616,155 issued Oct. 7, 1986 to Guichard and assigned to CITEL Company of France, shows an overvoltage discharger for coaxial cables. The Guichard '155 patent shows an outer conductor forming a bore. A second conductor body is retained within the first conductor and is suspended therein by a pair of rods attached to opposite ends of the second conductor. The rods are positioned generally coaxial with the first conductor by means of insulating members which seal open ends of the first conductor. The first conductor and the insulating seals over the opposite ends thereof define a chamber which house the second electrode therein.

The device as shown as Guichard '155 has many problems in that it is impractical for efficient and large scale use of such a protector. While Guichard '155 appears to have appreciated some of the benefits of a serially mounted protector, it does not provide any solutions for employing such a protector. More specifically, Guichard '155 specifically calls for a first and second rod which are attached to the second electrode. The structure may be unreliable and subject to vibrational or impact effects. Additionally, the connection between the conductor in a coaxial cable and the rods as shown in Guichard is achieved by solder connection. This clearly is impractical for wide use. A more desirable connection would be a mechanical connection.

A device overcoming the problems of the prior art as set forth hereinabove is unknown. As such, it would be highly desirable to provide a serially mounted surge arrester for use with a coaxial cable which can be easily connected to both the central conductor of the coaxial cable as well as the radially spaced outer shield conductor.

OBJECTS AND SUMMARY

A general object satisfied by the claimed invention is to provide a gas tube assembly for use with a coaxial surge arrester connector assembly.

Another object satisfied by the claimed invention is to provide a serially mounted coaxial surge arrester connector assembly for use in connecting coaxial cables.

Briefly, and in accordance with the foregoing, the present invention envisions a novel gas tube assembly and a novel connector assembly using the novel gas tube assembly. The gas tube assembly includes an outer electrode having a generally tubular construction, an inner electrode also having a generally tubular construction, and a pair of insulating members. The outer and inner electrodes have first and second ends. The insulators are attached to the first and second ends of both the outer electrode and the inner electrode retaining the inner electrode inside and spaced away from the outer electrode. The first and second ends of the inner and outer electrodes are sealed by the respective insulator. A chamber is defined between an internal surface of the outer electrode, an external surface of the inner electrode, and corresponding surfaces of the insulators. The chamber defines a toroidal void within the gas tube assembly which retains an inert gas therein. The outer and inner electrodes are constructed of a conductive material. The gas tube assembly may be employed with a connector assembly to provide standardized connection to coaxial conducting media.

BRIEF DESCRIPTION OF THE DRAWINGS

The organization and manner of the structure and function of the invention, together with further objects and advantages thereof, may be understood by reference to the following description taken in connection with the accompanying drawings, wherein like reference numerals identify like elements, and in which.

DESCRIPTION

Figure 2:
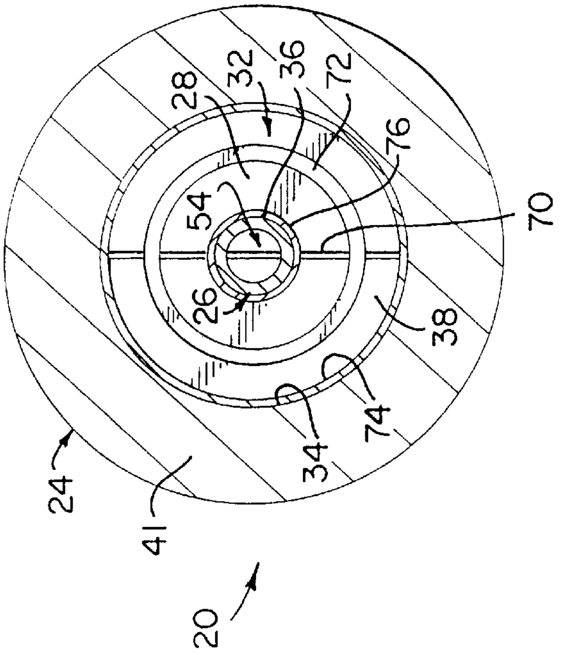
FIG. 2 is a cross-sectional, side elevational view taken along line 2—2 in FIG. 1 further illustrating the structure of the gas tube assembly.

While the present invention may be susceptible to embodiment in different forms, there is shown in the drawings, and herein will be described in detail, an embodiment with the understanding that the present description is to be considered an exemplification of the principles of the invention and is not intended to limit the invention to that as illustrated and described herein.

Figure 1:
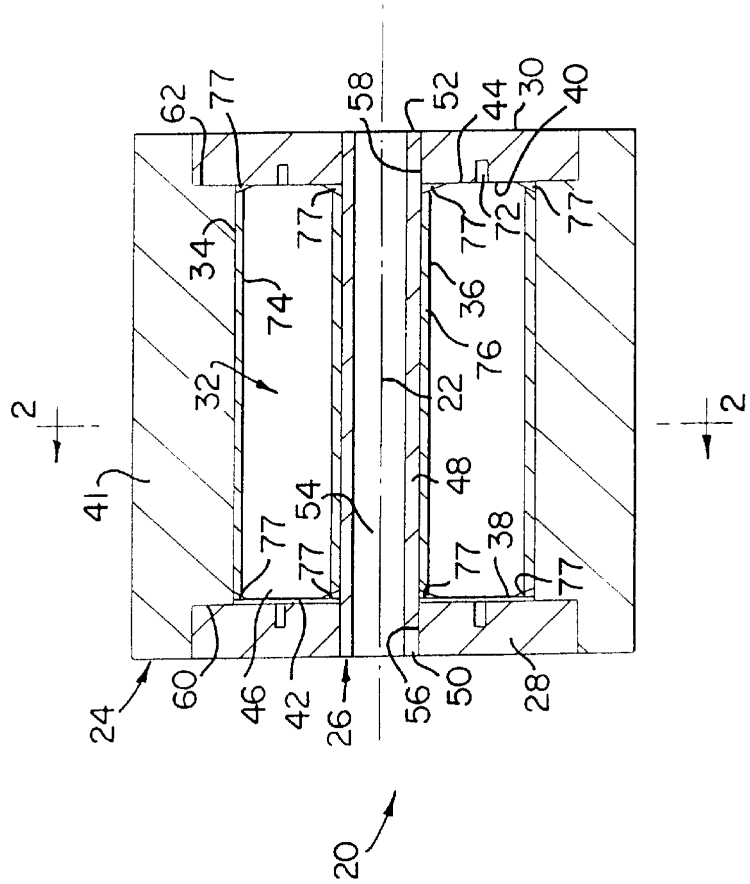
FIG. 1 is a cross-sectional, side elevational view of a novel gas tube assembly of the present invention having a first or outer tubular electrode, a second or inner tubular electrode, and first and second insulators positioned at opposite ends of the first and second electrodes.

As shown in FIG. 1, a gas tube assembly 20 of the claimed invention is shown in a cross-sectional view. It should be noted that the final configuration of the gas tube assembly 20 will be generally cylindrical and symmetric about a central axis 22. The gas tube assembly 20 includes a first or outer hollow, tubular, conductive electrode 24, a second or inner hollow, tubular, conductive electrode 26, and first 28 and second 30 insulating members or insulators. The insulating members 28, 30 are positioned to retain the inner tubular electrode 26 inside of and generally coaxial with the outer tubular electrode 24. A chamber 32 is defined between an internal surface 34 of the outer electrode 24, an external surface 36 of the inner electrode 26 and the corresponding internal surfaces 38, 40 of the first and second insulators 28, 30. The chamber 32 has a generally toroidal shape filled with a gas such as an inert gas.

Figure 4:
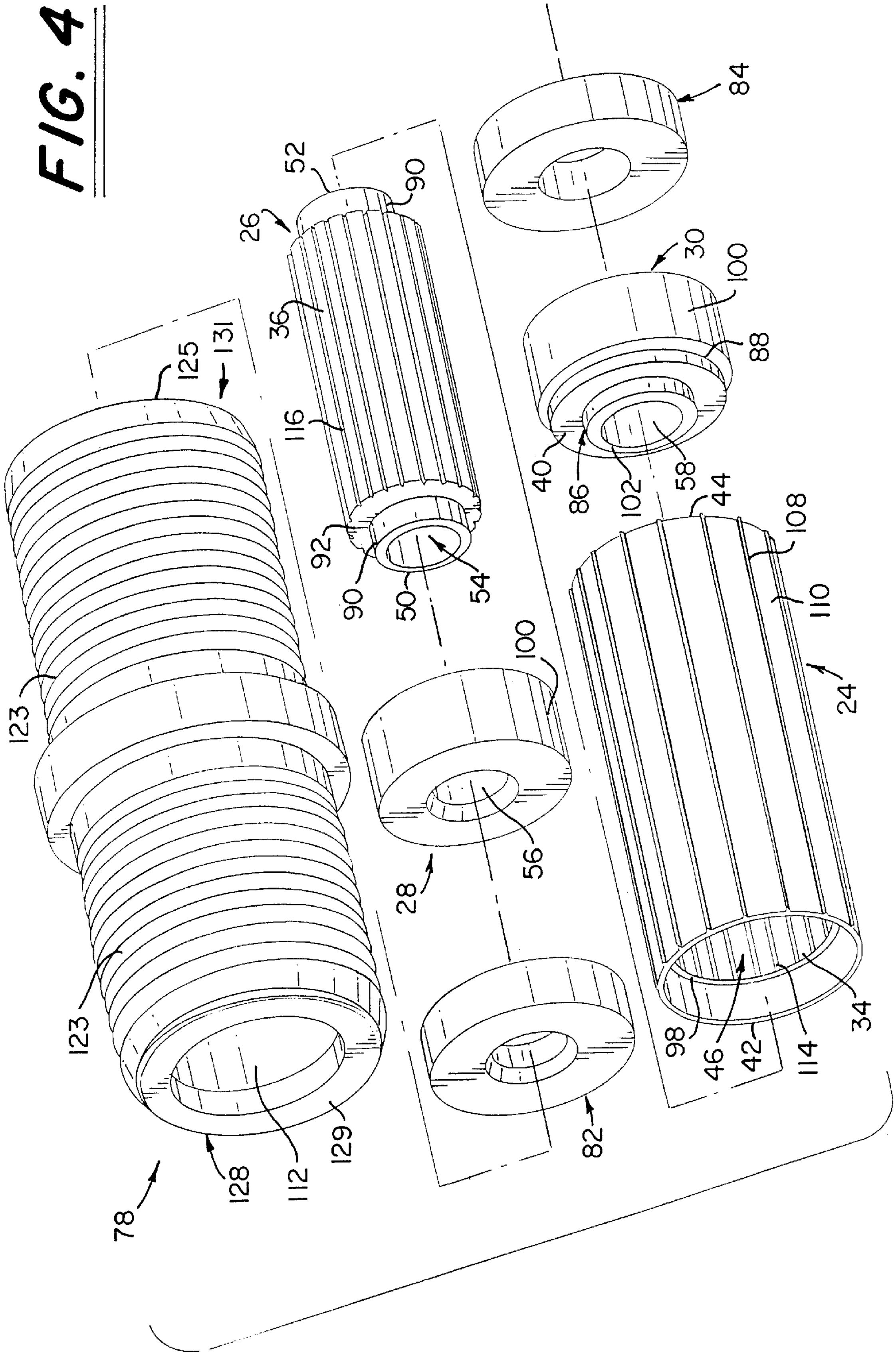
FIG. 4 is an exploded perspective view of the connector assembly as shown in FIG. 3 to further illustrate the configuration of the components comprising the connector assembly and the gas tube assembly and the surface structures on such components.

With further reference to FIG. 1 and FIG. 4, the gas tube assembly 20 includes a number of openings, apertures, or ports. More specifically, the outer electrode 24 has a wall 41 which defines a first open end 42 and a second open end 44 with a generally hollow tubular passage 46 defined therebetween. Similarly, the inner electrode 26 has a wall 48 defining a first end 50, a second end 52, and a generally hollow tubular cavity or passage 54 therebetween. The first and second insulators 28, 30 are generally disk-like structures formed of a dielectric material with an aperture 56, 58 therein. As shown in FIG. 1, the gas tube assembly 20 is assembled with the first and second insulators 28, 30 engaged in corresponding annular recesses 60, 62 on respective first and second open ends 42, 44 of the outer tubular electrode 24. The first and second ends 50, 52 of the inner tubular electrode 26 extend through the apertures 56, 58 of the first and second insulators 28, 30. As such, the gas tube assembly 20 as defined hereinabove includes the generally toroidal chamber 32 positioned between the internal surface 34 of the outer electrode 24 and the external surface 36 of the inner electrode 26. The first and second insulators 28, 30 seal the chamber 32. The passage 54 extending through the inner electrode 26 facilitates conductive coupling therein as described hereinbelow.

The gas tube assembly 20 of the present invention has all the beneficial properties of limiting transient voltages which may be induced on a line connected to the gas tube assembly 20 to the maximum limits established by industry standards. The present invention differs from shunt-type voltage limiters in that it is configured to be mounted serially and conductively coupled to both a central conductor 64 and an outer conductor 66 of a coaxial cable 68 (see FIG. 3). The dimensions and materials used in the outer tubular electrode 24, inner tubular electrode 26, and the chamber 32 are selected and configured in accordance with the known formulas pertaining to impedance to maintain a characteristic impedance across the discontinuity created by the gas tube assembly 20. As shown in FIG. 2, the gas tube assembly 20 includes carbon stripes 70 which are inscribed on the interior surfaces 38, 40 of the insulators 28, 30. These stripes 70 act to trigger the breakdown voltages just above the nominal DC breakdown level. Further, a groove 72 is provided on the interior surfaces 38, 40 of the insulators 28, 30 to provide an electrical leakage break. The leakage break prevents the reduction in insulation resistance between the two electrodes 24, 26 and at the same time permits the easy and convenient application of the carbon stripe by the operator.

An emission coating 74 is applied to the internal surface 34 of the outer electrode 24 and an emission coating 76 is applied to the external surface 36 of the inner electrode 26. The emission coatings 74, 76 are formed of the same material and are created during the activation cycle and fused to the corresponding surfaces 34, 36 to ensure a supply of electrons as needed during the operating cycle of the gas tube assembly 20. The emission coatings 74, 76 enhance the endurance of the gas tube assembly 20 to repeated applications of changes in voltages such as lightening strikes. The emission coatings 74, 76 supply low work function on the surfaces 34, 36 of the electrodes 24, 26 and provide a ready supply of secondary electrons. The secondary electron yield not only ensures a tight distribution of breakdown voltages, but also ensures a low arc voltage which permits thousands of surges without occurrence of erosion of the electrodes 24, 26. The coatings 74, 76 virtually eliminate the occurrence of electrode erosion.

Emission coatings 74, 76 consist of materials having low work function characteristics, and are compounded with other elements during a fusing procedure. To obtain the desired low work function surface on the electrodes 24, 26 in the sealed tube, it is necessary to “activate” the coatings 74, 76. This procedure is accomplished by applying a calibrated level of electric charge to each gas tube assembly 20. By this procedure, the elements of the fused compounds are dissociated and the desired low work function film or coating 74, 76 is established. The net effect of the activation cycle is to create discharge surfaces 34, 36 which becomes highly electron emissive with negligible erosion of the electrodes 24, 26 during initial service life testing.

Generally, the gas tube assembly 20 of the present invention is manufactured using known manufacturing techniques. The gas tube assembly 20 is assembled with brazing rings of a copper/silver material placed at the first and second ends 50, 52 and 42, 44 of the inner 26 and outer 24 electrodes where they intersect the first and second insulators 28, 30. These brazing rings, when heated, form fillets 77 of brazing materials shown in the figures. During the process and before the brazing rings form the fillets 77, the assembled gas tube assemblies 20 are placed in a vacuum furnace and evacuated of all atmospheric gas. The vacuum furnace is then sealed from the exhaust system and the chamber is filled with a gas such as an inert gas to a desired fill pressure to achieve a breakdown voltage. The temperature of the furnace is then raised above the melt temperature of the brazing material which is generally a eutectic. The furnace is then cooled resulting in the inert gas being entrapped in the gas tube at the desired pressure. The assembled gas tubes 20 are then activated to obtain a stable DC breakdown voltage. Common breakdown voltages are 90, 145, and 230 volts. The different breakdown voltages are achieved by adjusting the inert gas pressure according to the relationships established by the Paschen curves which are commonly used in the practice of manufacturing gas tubes.

Figure 3:
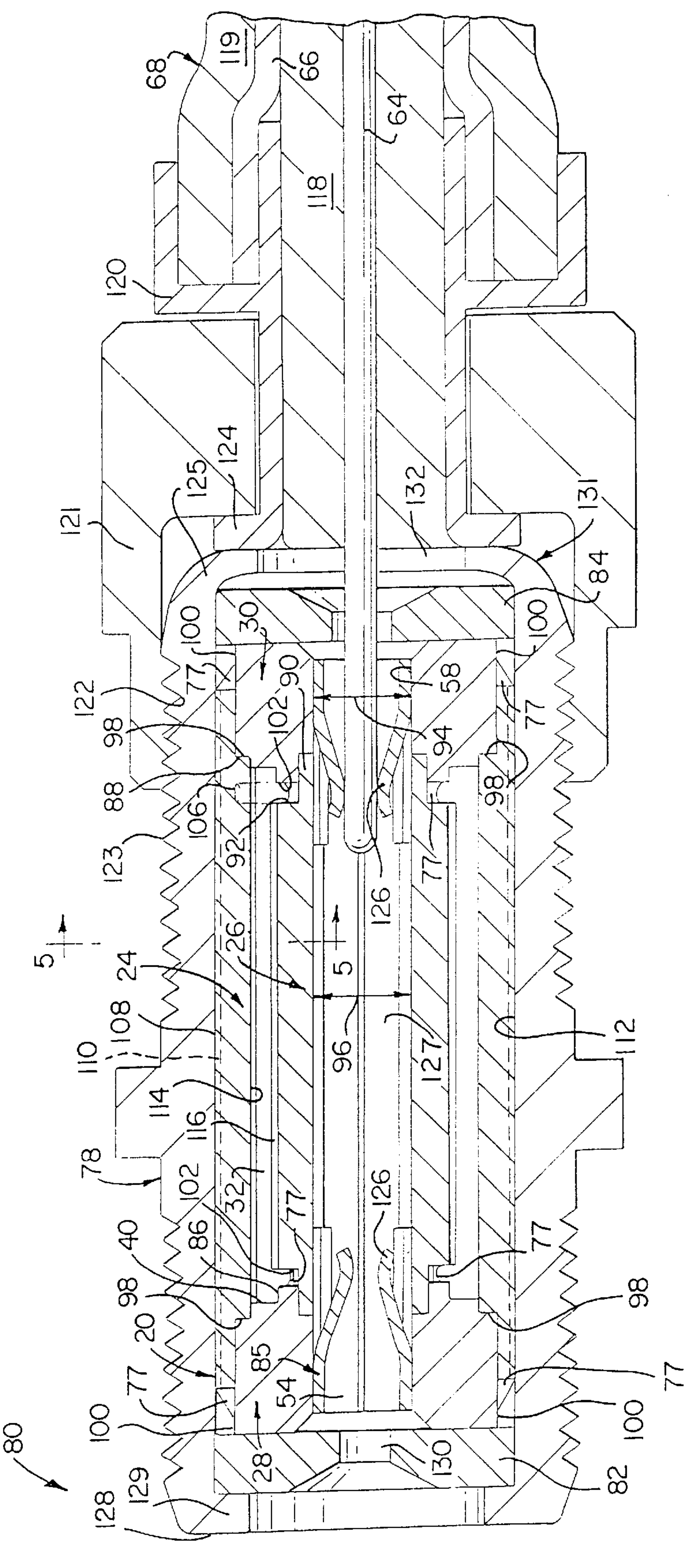
FIG. 3 is a partial fragmentary, cross-sectional, side elevational view of the gas tube assembly in accordance with the teachings of the present invention as used in a standardized connector housing to which a portion of coaxial cable has been attached.
Figure 5:
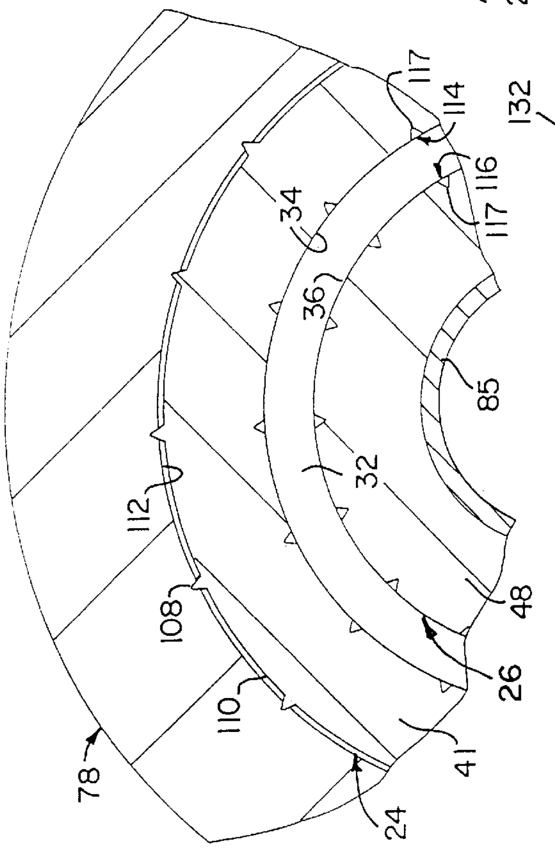
FIG. 5 is a partial fragmentary, cross-sectional, side elevational view taken along line 5—5 in FIG. 3 further illustrating the surface structures on the external surface of the inner electrode, the internal surface of the outer electrode, and the external surface of the outer electrode.

FIGS. 3–5 provide additional detail with regard to a preferred embodiment of the gas tube assembly 20 as employed in a standardized "F" type coaxial connector housing 78. As shown in FIGS. 3–5, the gas tube assembly 20 has been integrated into the connector housing 78 as opposed to being separate from or separately connected to the connector housing 78. This integrated connector housing 78 and gas tube assembly 20 reduces the number of components involved in connecting and protecting coaxial cables 68. Additionally, it is desirable to provide the gas tube assembly 20 within a standardized housing 78 to provide easy integration into standard systems and manufactured assemblies.

A connector assembly 80 is shown in FIG. 3 which includes the housing 78 and the gas tube assembly 20 retained in the housing 78. A pair of nonconductive spacers 82, 84 are positioned inside the housing 78 to properly space the gas tube assembly 20 therein. The gas tube assembly 20 as shown in FIG. 3 is substantially identical to the gas tube assembly 20 as shown in FIG. 1 except for variations in the dimensions of the various components to fit the gas tube assembly 20 into the connector housing and achieve a desired impedance characteristic. Additionally, the connector assembly 80 as shown in FIG. 3 includes a contact structure 85 retained in the passage 54 of the inner electrode 26.

The connector assembly 80 as shown in FIGS. 3–5 employs a series of shoulders, necks, recesses, and rims to properly position and attach the outer electrode 24, inner electrode 26, and insulators 28, 30. The insulators 28, 30 include an annular rim 86 generally centrally disposed on the faces 38, 40 thereof and an annular recess 88 disposed radially spaced away from the annular rim 86. The inner electrode 26 includes an annular neck 90 and an annular shoulder 92. The annular neck 90 is positioned against an internal surface of the annular rim 86. As such, an internal dimension 94 of the aperture 58 is substantially equal to the internal dimension 96 of the inner electrode 26. The general equivalency of the dimensions 94, 96 allows the connector structure 84 to be conveniently inserted into the gas tube assembly 20. The outer electrode 24 is formed with a recessed mouth 98. The recessed mouth 98 provides abutment with the annular recess 88.

The insulators 28, 30 are generally identical thus promoting additional manufacturing efficiencies. In a preferred embodiment, the insulators 28, 30 are formed of a high density alumina ceramic. In order to provide a bond between the generally metallic conductors 24, 26, a metallized surface 100 is provided on outside surfaces of the insulators 28, 30. Similarly, the top 102 of the annular rim 86 is a metallized surface. These metallized surfaces promote wetting and bonding or fusing of the brazing material 77 to the respective portions of the electrodes 24, 26. As shown in FIG. 3, the brazing material has been melted to form a fillet 77 between the corresponding surfaces of the tubular electrodes 24, 26 and the abutting insulator surfaces 100, 102. In this regard, it should be noted that a gap 106 is provided between the inner electrode 26 and the abutting surface of the insulators 28, 30. This gap 106 will accommodate a ring of brazing material which, when melted, forms the fillet 77.

With further reference to FIG. 5, a series of external ribs 108 are provided on and project from an external surface 110 of the outer tubular electrode 24. The ribs 108 are used to securely engage and assure conductive engagement with an internal surface 112 of the housing 78.

A series of longitudinal grooves 114 are formed on the internal surface 34 of the outer electrode 24 and a series of longitudinal grooves 116 are formed on the external surface 36 of the inner electrode 26. The grooves 114, 116 are provided on the corresponding surfaces 34, 36 of the outer and inner electrodes 24, 26 to retain an emission coating material 117. The emission coatings 74, 76 shown in FIG. 1 are a generally continuous coating applied to the corresponding surfaces. In contrast, the emission coating 117 is provided in the grooves 114, 116 as shown in FIG. 5 to provide better attachment of the emission coating material 117 to the corresponding surfaces.

Having discussed the structure and function of the connector assembly 80 and the gas tube assembly 20 retained in the housing 78, we now review the use of this connector assembly 80 in connection to a coaxial cable 68 as shown in FIG. 3. The coaxial cable 68 includes the central conductor 64 which is spaced from the shield conductor 66 by a dielectric layer 118. An outer insulating jacket 119 covers the shield conductor 66. The coaxial cable 68 is prepared by providing a conductive crimp connector 120 having a conductive nut body 121 rotatable retained thereon having internal threads 122. External threads 123 are provided on the connector housing 78. When the threads 122 and 123 are engaged, the conductive crimp connector 120 rotatably retains the nut 121 on an end of the coaxial cable 68. Further, the connector 120 provides a conductive coupling to the external shield or conductive braid 66 of the cable 68. As such, a conductive path runs from the shielding material 66 through the conductive crimp connector 120 to the nut 121 and leading flanges 124. The leading flanges 124 abut a rim 125 of the housing 78 thereby providing a conductive path through the conductive housing 78 to the outer electrode 24 of the gas tube assembly 20.

The central conductor 64 of the cable 68 is inserted into the contact structure 85. The central conductor 64 extends through an opening in the corresponding spacer 84 and into the contact structure 85. The contact 85 includes a pair of opposed springbiased retaining arms 126 which engage the central conductor 64. As such, a conductive path from the central conductor 64 through the conductive material of the retaining arms 126 to a barrel portion 127 of the contact structure 85. The barrel portion 127 is conductively engaged with the internal surface 36 of the inner electrode 26. Similarly, a central conductor coming from the opposite side of the connector assembly 80 will be engaged with corresponding retaining arms thereby conductively coupling both central conductors.

A first end 128 of the housing 78 includes a first lip or shoulder 129 defining a first port 130. A second end 131 of the housing includes an open port 132. During the assembly of the connector assembly 80, the first spacer 82 is inserted and positioned against the shoulder 129. The gas tube assembly 20 is then axially inserted into the housing 78. Some driving force may need to be applied in order to engage the ribs 108 with the internal surface 112 of the housing 78. Next, the spacer 84 is inserted and then the second end 131 is deformed to form the rim 125 defining the second port 131.

Figure 6:
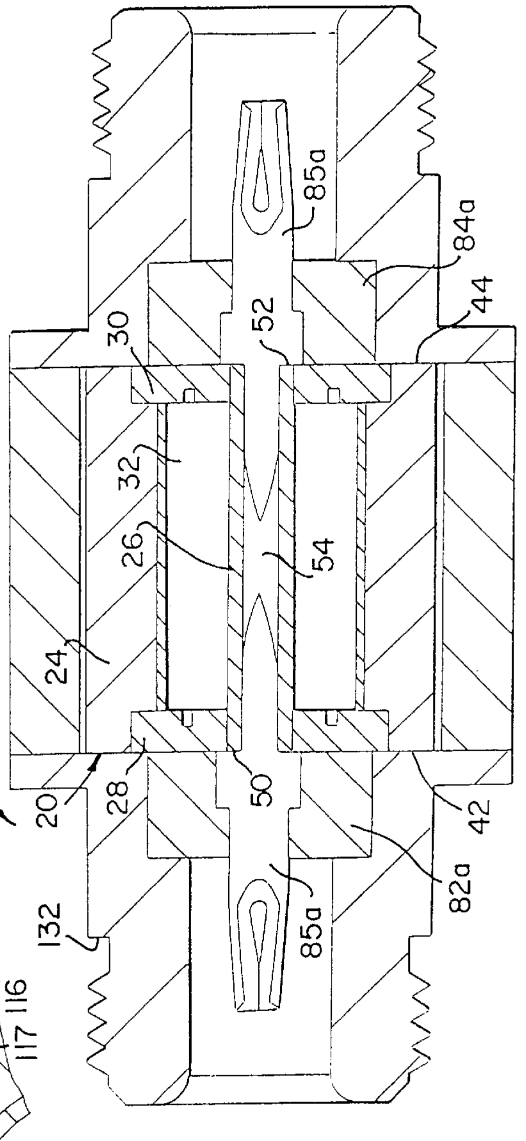
FIG. 6 shows another embodiment of a connector assembly providing a female-female connection coupled to the novel gas tube assembly of the present invention.
Figure 7:
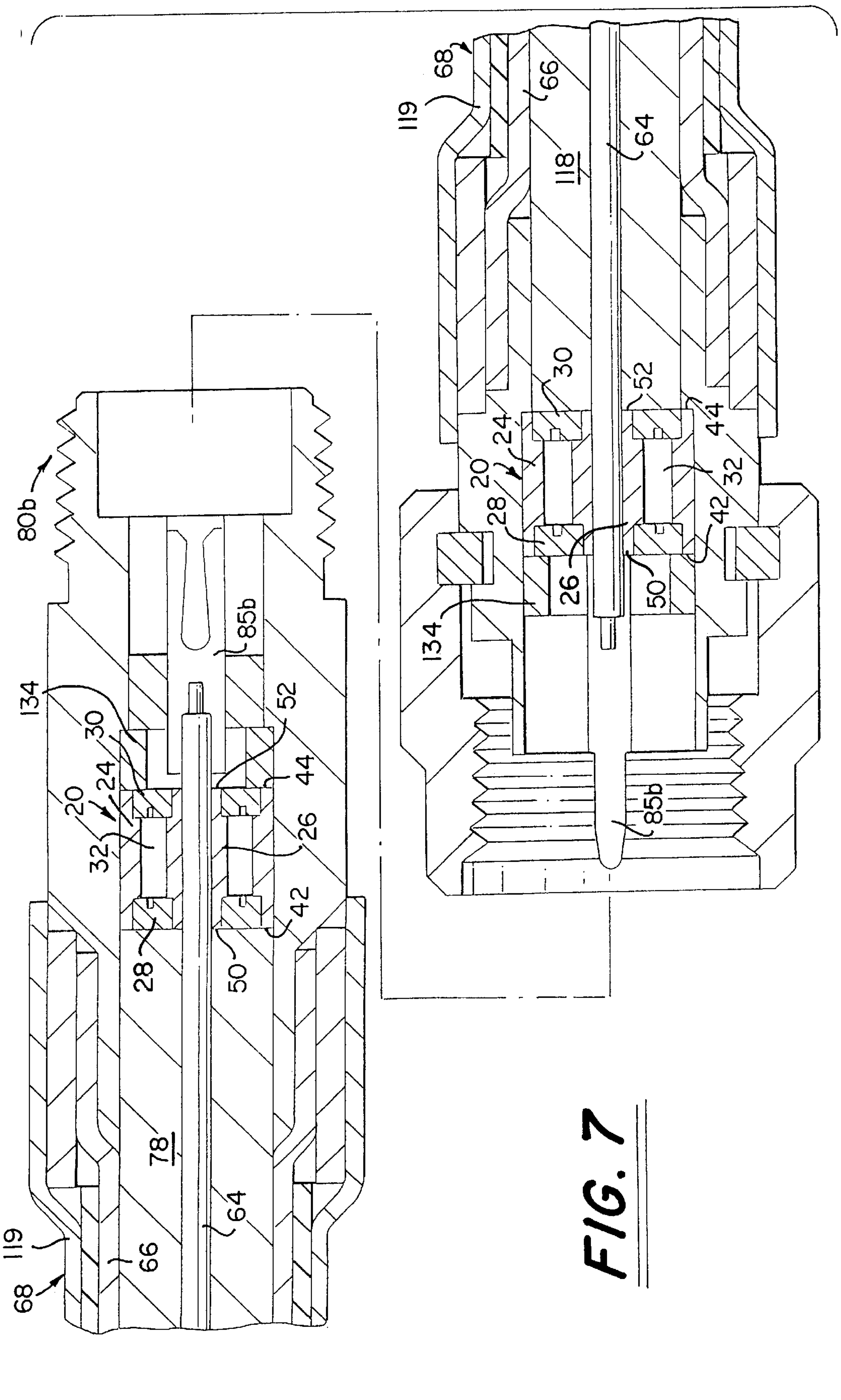
FIG. 7 is another embodiment of a connector assembly which employs a novel gas tube assembly of the present invention with each end of the connectors and further including a fail short structure to provide redundant protection.

FIG. 6 and 7 show additional embodiments of the gas tube employed in a connector assembly. The connector assembly **80*a* as shown in FIG. 6 and the connector assembly 80*b* as shown in FIG. 7 are alternate embodiments of the connector assembly 80 as shown in FIG. 3. All of the connector assemblies employ the novel gas tube assembly 20 of the present invention. In FIG. 6, the gas tube assembly is retained in a double female connector housing 132. This is a more generic form of the double female connector as shown in FIG. 3 although FIG. 3** employs "F"-style housing.

As shown in FIG. 7, a gas tube assembly 20 is provided on each end of the connector assembly 80*b*. As such, redundancy is provided in this connector assembly 80*b*. Further, FIG. 7 employs a collar 134 of a low melt-temperature material. The low melt-temperature material is conductive and is positioned in conductive engagement with the outer electrode 24. The conductive collar 134 provides a fail short mechanism to provide another level of redundancy in this connector 80*b* protection system. The collar 134 may be configured for use with the other embodiments of the invention.

The fail short conductive collar 134 ensures that the central conductor 64 will short to the outer conductor or shield 66 in the event of a power-cross. During a power-cross a continuous voltage may appear on a line of sufficient amplitude to cause the gas tube 20 to operate and cause a continuous current flow. The continuous current flow through the gas tube 20 will generate heat and cause the temperature of the collar 134 to rise. When the temperature of the collar 134 reaches the melt temperature of the material comprising the collar 134, the collar will melt. As the collar material melts it will wet and form a bridge between the outer electrode 24 and the second electrode 26.

While a preferred embodiment of the present invention is shown and described, it is envisioned that those skilled in the art may devise various modifications and equivalents without departing from the spirit and scope of the appended claims. The invention is not intended to be limited by the foregoing disclosure.

The invention claimed is:

1. A gas tube assembly comprising:

an outer tubular electrode having at least one wall defining an outer passage extending therethrough, said outer electrode having a first and second end;

an inner electrode having at least one wall defining an inner passage extending therethrough, said inner electrode being generally tubular along its length and extending from a first tubular end portion to a second tubular end portion, said inner tubular electrode being positioned generally coaxially in said outer passage, said first and second tubular end portions of said inner electrode positioned proximate to said first and second ends of said outer tubular electrode;

first and second insulators sized and dimensioned for abutting said first and second ends of said outer electrode and said first and second ends of said inner electrode, each of said first and second insulators having an aperture therein which receives said first and second tubular end portions of said inner tubular electrode; and a chamber being defined between an internal surface of said outer electrode, an external surface of said inner electrode, and corresponding internal surfaces of said first and second insulators, said chamber containing an inert gas.

2. A gas tube assembly as recited in claim 1, further comprising:

a contact structure positioned in said inner passage for connecting conductor elements of a coaxial cable.

3. A gas tube assembly as recited in claim 1, further comprising:

an emission coating on said internal surface of said outer electrode for improving the endurance of the gas tube assembly to withstand repeated surges.

4. A gas tube assembly as recited in claim 3, further comprising:

a textured surface on said internal surface of said outer electrode, said textured surface providing areas for retaining said emission coating on said outer electrode.

5. A gas tube assembly as recited in claim 1, further comprising:

an emission coating on said external surface of said inner electrode for improving the endurance of the gas tube assembly to withstand repeated surges.

6. A gas tube assembly as recited in claim 5, further comprising:

a textured surface on said external surface of said inner electrode, said textured surface providing areas for retaining said emission coating on said inner electrode.

7. A gas tube assembly as recited in claim 1, further comprising:

an annular recess on each of said first and second ends of said outer electrode for receiving a corresponding portion of said first and second insulators.

8. A gas tube assembly as recited in claim 1, further comprising:

an annular rim on each of said first and second insulators proximate to said aperture in each of said first and second insulators, an external diameter of said rim generally corresponding to an internal diameter of said inner electrode and at least a portion of said inner electrode abuts said annular rim.

9. A gas tube assembly as recited in claim 1, further comprising:

a fail short structure in said arrester for maintaining a short in said arrester.

10. A gas tube assembly as recited in claim 9, wherein said fail short structure is a solder ring retained between said inner surface of said outer electrode and said outer surface of said inner electrode.

11. A gas tube assembly comprising:

an outer, hollow, tubular electrode;

an inner, hollow electrode positioned in said outer electrode and being generally tubular along its length extending from a first tubular end portion to a second tubular end portion;

a pair of insulators, said insulators being spaced apart and abutting respective opposite ends of said outer and inner electrodes, said insulators having apertures which receive said tubular end portions of said inner electrode and retain an external surface of said inner electrode spaced away from an internal surface of said outer electrode; and a chamber being defined between said internal surface of said outer electrode, said external surface of said inner electrode and said insulators, said chamber containing an inert gas.

12. A connector assembly for use in connecting coaxial cables and providing protection from over-voltage conditions, said connector assembly comprising:

a housing, said housing having at least one wall defining a central bore extending therethrough, said housing having first and second spaced apart ends;

a gas tube assembly retained in said housing, said gas tube assembly having a first and second port generally coincident with said first and second ends of said housing, respectively;

said gas tube assembly having an outer electrode, an inner electrode and two insulators, said outer electrode having first and second ends, said inner electrode being generally tubular along its length and extending from a first tubular end portion to a second tubular end portion, said insulators having apertures which receive said tubular end portions of said inner electrode and retain said inner electrode generally coaxial with and spaced away from said outer electrode and sealing said first and second ends of said inner and outer electrodes, a chamber being defined between an internal surface of said outer electrode and an external surface of said inner electrode with said insulators sealing said first and second ends of said inner and outer electrodes.

13. A connector assembly as recited in claim 12, further comprising:

a contact retained within said inner electrode, said contact receiving a conductive component of a coaxial cable into said inner electrode for electrically coupling said coaxial cable with said inner electrode.

14. A connector assembly as recited in claim 13, wherein said contact is a split barrel structure which is outwardly biased, said contact being slightly compressible for insertion to said inner electrode and providing a biasing force when released which retains said contact in said inner electrode.

15. A connector assembly as recited in claim 13, said contact further comprising spring biased retaining arms generally positioned at opposite ends of said contact, said spring biased retaining arms engaging and gripping a conductor of a coaxial cable for retaining said coaxial cable in engagement with said contact.

16. A coaxial connector as recited in claim 13, further comprising threaded areas on an outside surface of said first and second ends of said housing, said threaded areas receiving corresponding threaded nuts attached to coaxial cables for engaging said coaxial cables in said contact and retaining said coaxial cables in engagement therewith.

17. A surge arrester assembly comprising:

an outer tubular electrode having at least one wall defining an outer electrode passage, said outer electrode having a first and second end;

an inner electrode having at least one wall defining an inner electrode cavity, said inner electrode being positioned in said outer electrode passage of said outer electrode, said inner electrode being generally tubular along its length and extending from a first tubular end portion to a second tubular end portion, said first and second end tubular end portions of said inner electrode oriented relative to said first and second ends of said outer tubular electrode;

first and second insulators sized and dimensioned for attachment to said first and second ends of said outer electrode, respectively, and said first and second ends of said inner electrode, respectively, at least said first insulator having an aperture therein which receives one of said tubular end portions of said inner electrode; and a chamber being defined between an internal surface of said outer electrode, an external surface of said inner electrode, and corresponding internal surfaces of said first and second insulators.

18. A surge arrester assembly as recited in claim 17, wherein at least said first end of said inner electrode providing access to said inner electrode cavity.

19. A surge arrester assembly as recited in claim 17, wherein said inner electrode and said first and second ends of said inner electrode are generally coaxially aligned with said outer electrode and said first and second ends of said outer electrode.

20. A surge arrester assembly as recited in claim 17, further comprising:

a contact structure positioned in said inner electrode cavity for connecting at least one conductor element of a coaxial cable.

21. A surge arrester assembly as recited in claim 17, further comprising:

an emission coating on at least one of said internal surface of said outer electrode and said external surface of said inner electrode for improving the endurance of the surge arrester assembly to withstand repeated surges.

22. A surge arrester assembly comprising:

a first electrode having at least one wall defining a first electrode cavity therein, said first electrode having a first and second end;

a second electrode having at least one wall defining a second electrode cavity therein, said second electrode being retained in said first electrode cavity, said second electrode cavity being generally tubular along its length and extending from a first tubular end portion to a second tubular end portion, an external surface of said second electrode being spaced from an internal surface of said first electrode, said first and second tubular end portions of said second electrode oriented with said first and second ends of said first electrode;

a dielectric material retained between said internal surface of said first electrode and said external surface of said second electrode; and an insulator insulating means abutting said first and second electrodes for receiving one of said tubular end portions of said second electrode thereby spacing apart at least a portion of said internal surface of said first electrode from at least a portion of said external surface of said second electrode.

23. A surge arrester assembly as recited in claim 22, further comprising:

a chamber being defined between said internal surface of said first electrode and an external surface of said second electrode, with said dielectric material being retained in said chamber.

24. A surge arrester assembly as recited in claim 23, further comprising:

said chamber between said first and second electrodes being sealed at said first and second ends of said first and second electrodes, a gas being retained in said chamber.

25. A surge arrester assembly as recited in claim 24, further comprising:

said gas retained in said chamber being an inert gas.

26. A surge arrester assembly as recited in claim 23, wherein said insulator comprises first and second spaced apart insulators, said chamber being defined between said internal surface of said first electrode, said external surface of said second electrode, and surfaces of said first and second insulators with said dielectric material being retained in said chamber.

27. A surge arrester assembly as recited in claim 22, further comprising:

a contact structure retained in said cavity of said second electrode cavity for coupling at least one conductor element of a coaxial cable to said second electrode.

28. A surge arrester assembly as recited in claim 22, further comprising:

an emission coating on at least one of said internal surface of said first electrode and said external surface of said second electrode for improving the endurance of said surge arrester assembly to withstand repeated surges.

29. A connector assembly for use in connecting at least one coaxial cable thereto and providing protection from over-voltage conditions, said connector assembly comprising:

a housing having at least one wall defining a central bore extending therethrough, said housing having first and second spaced apart ends with a conductive path extending between said first and second ends;

an inner electrode retained in said housing, said inner electrode being generally tubular along its length extending from a first tubular end portion to a second tubular end portion, an external surface of said inner electrode being spaced from an internal surface of said housing, said first and second tubular end portions of said inner electrode oriented relative to said first and second ends of said housing;

a dielectric material retained between said internal surface of said housing and said external surface of said inner electrode; and an insulator abutting said housing and said inner electrode and having an aperture receiving one of said tubular end portions of said inner electrode thereby spacing apart at least a portion of said internal surface of said housing from at least a potion of said external surface of inner electrode.

30. A connector assembly as recited in claim 29, further comprising:

a chamber being defined between said internal surface of said housing and an external surface of said inner electrode, with said dielectric material being retained in said chamber.

31. A connector assembly as recited in claim 30, further comprising:

said chamber between said housing and said inner electrode being sealed at said first and second ends, a gas being retained in said chamber.

32. A connector assembly as recited in claim 31, further comprising:

said gas retained in said chamber being an inert gas.

33. A connector assembly as recited in claim 32, wherein said contact is a split barrel structure which is outwardly biased, said contact being slightly compressible for insertion to said inner electrode and providing a biasing force when released for retaining said contact in said inner electrode.

34. A connector assembly as recited in claim 32, said contact further comprising spring biased retaining arms generally positioned at opposite ends of said contact, said spring biased retaining arms engaging and gripping a conductor of a coaxial cable for retaining said coaxial cable in engagement with said contact.

35. A connector assembly as recited in claim 32, further comprising a threaded area on outside surface of at least one of said first and second ends of said housing, said threaded area receiving corresponding threaded nut attached to a coaxial cable for engaging said coaxial cable in said contact and retaining said coaxial cable in engagement therewith.

36. A connector assembly as recited in claim 30, wherein said insulator comprises first and second spaced apart insulators, said chamber being defined between said internal surface of said housing, said external surface of said inner electrode, and surfaces of said first and second insulators with said dielectric material being retained in said chamber.

37. A connector assembly as recited in claim 29, further comprising:

a contact structure retained in said cavity of said inner electrode for coupling at least one conductor element of a coaxial cable to said inner electrode.

38. A connector assembly as recited in claim 29, further comprising:

an emission coating on at least one of said internal surface of said housing and said external surface of said inner electrode for improving the endurance of said connector assembly to withstand repeated surges.

* * * * *